Sept. 21, 1948.  W. E. AUSTEN  2,449,870
CLINOMETER
Filed Oct. 19, 1944
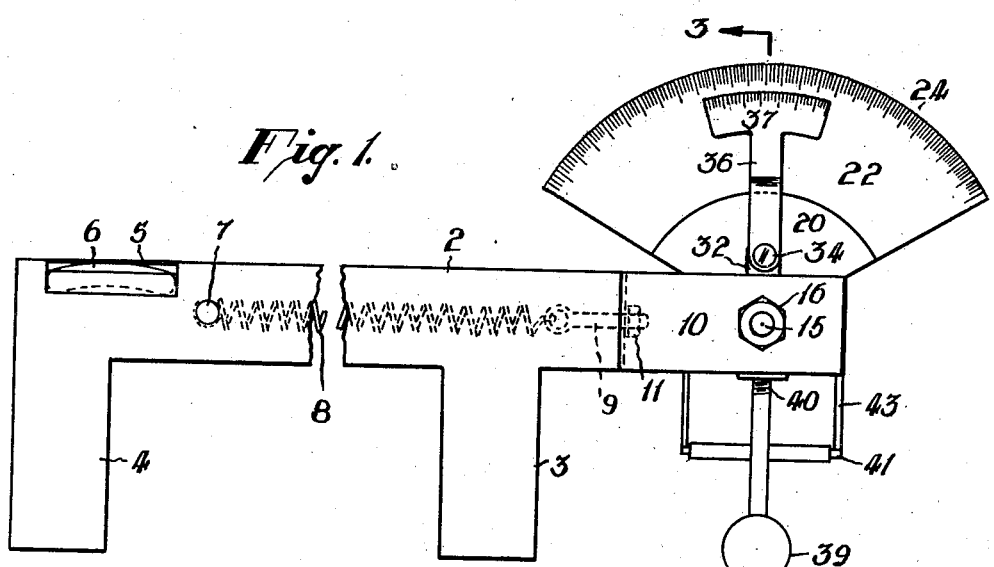
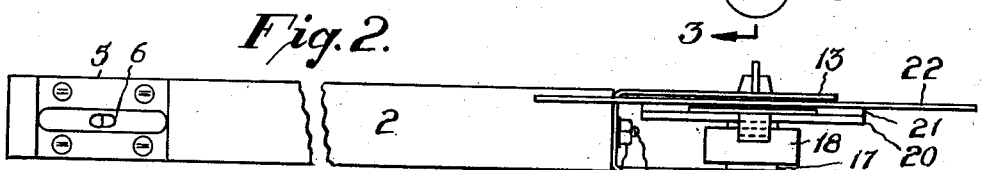
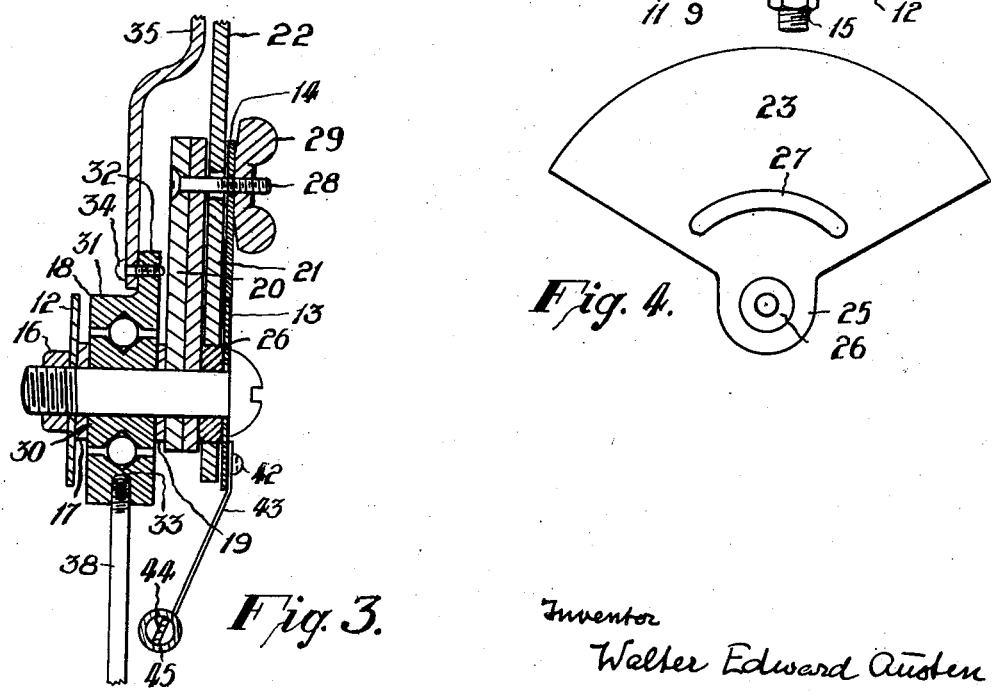
Inventor
Walter Edward Austen Patented Sept. 21, 1948

2,449,870

UNITED STATES PATENT OFFICE 2,449,870

CLINOMETER

Walter Edward Austen, Melbourne,
Victoria, Australia

Application October 19, 1944, Serial No. 559,406
In Australia September 11, 1943

6 Claims. (Cl. 33—218)

This invention relates to improvements in clinometers. More specifically, it refers to an improved hand instrument which will be found to have a wide range of uses in measuring or indicating angles of elevation and inclination, dihedral angles, the opening angles of doors, and the slope of plane and curved surfaces.

A principal object of the invention is to provide an efficient clinometer of compact, durable construction which is capable of being manufactured economically so as to be available at relatively low cost to surveyors, engineers and other technicians in addition to manufacturers who from time to time have need for an instrument of this nature.

The improved clinometer comprises a level-bar provided at a suitable location with a bubble tube. Slots are formed in the upper surface and also in the opposite sides of the level-bar in order that the bubble tube can be inspected in the different poistions at which the instrument is capable of being set. A protractor is pivotally fitted to one end of the level-bar, and means are provided for locking it in pivotally adjusted position.

Legs of equal length are provided on the underneath surface of the level-bar at right angles to the same. One of the legs is at the end of the instrument opposite to the protractor head and has its outer surface flush with the end of the level-bar. The instrument may be placed flatwise on either of its sides to provide a wide area of contact on a spongy surface, or it can be supported lengthwise by resting upon both legs. Alternatively, the instrument can be held with the outer surface of the end leg against a vertical or steeply inclined surface.

Securely fitted in the protractor head is a transverse spindle whereon is fitted a freely rotatable bearing having attached thereto a pointer which is gravity-actuated by a depending weighted member. A protractor is pivotally fitted about said spindle and it is independently adjustable. Means are provided for holding the protractor stationarily in adjusted position.

A device is provided for use with the clinometer when the weighted member has been detached from the freely rotatable bearing and the instrument is to be used for measuring or indicating the angles of openings of hingedly mounted objects and for similar purposes. The said device comprises a long arm adapted for connection at one end to said bearing and having at its opposite end a slidably fitted sleeve or guide provided with attachment means.

An exemplary embodiment of the invention is illustrated in the accompanying drawings, to which reference is now made for the purpose of a detailed description.

Fig. 1 is a view illustrating the improved clinometer in side elevation.

Fig. 2 is a plan view of the same.

Fig. 3 is a section on enlarged scale on the lines 3—3 of Fig. 1.

Fig. 4 is a detail view illustrating the construction of the protractor.

In these views 2 designates a level-bar formed of suitable metal and adapted to be rigidly supported by legs 3 and 4 which are of equal length and disposed at right angles to said bar. The level-bar and its supporting legs, which may be of any suitable shape in cross-section and are preferably of hollow construction, are machined so that their surfaces are flat and opposite surfaces of each of the said instrument parts are in parallelism. The leg 3 is positioned towards one end of the level-bar, while the other leg 4 is situated at the opposite end of the instrument and has its outer surface accurately aligned with the end of said level-bar. Thus, the instrument can be supported horizontally by the legs 3 and 4 as seen in Fig. 1, and it is also adapted to be set in upright fashion with the outer end of the bar and the aligned leg 4 serving as a supporting base.

A bubble tube 5 of the description used in spirit levels is firmly seated in a recess which is formed accurately in the upper portion of the bar 2 near one end, and slots 6 in the top and side surfaces of said bar permit observations to be made of the vapor bubble when the instrument is supported in different positions.

Secured in the level-bar 2 is a screw or rivet 7 which provides an anchorage for one end of a helical tension spring 8 having its opposite end fastened to an eye-bolt 9 passing through the end of the level-bar 2 and through the adjacent end of a protractor head 10. This protractor head 10 is constructed as a longitudinal extension of the level-bar and a nut 11 is fitted on the eye-bolt 9 so that the protractor head will be firmly held in abutment with the end of the level-bar 2, as seen in Fig. 1, by the tension of the said spring. The spring tension may be adjusted by turning the nut on the eye-bolt, and the protractor head is adapted for pivotal movement about the eye-bolt 9 whereby it can be conveniently set at different angles to the level-bar as from time to time is necessary or desirable.

The protractor head 10 has two parallel, spaced cheek plates 12 and 13, the latter having an upward extension 14. A bolt 15 is fitted transversely through said cheek plates and is rigidly held in position by a nut 16. Clamped on the bolt 15 between said cheek plates 12 and 13 are the following integers: a spacing washer 17, a ball race 18, a spring washer 19, a clamping plate 20 having a friction sheet 21 fastened thereto, and a protractor 22.

The protractor 22 which is of the construction illustrated in Figs. 1 and 4 consists of a flat plate 23 substantially of segmental shape having around its perimeter graduations 24 indicating suitable angular measurements. The plate 23 has a boss 25 provided with an axial hole wherein is fitted a sleeve 26. This sleeve 26 is of slightly greater thickness than the plate 23 and it is preferably made of fibre so that when assembled between the cheek plates 12 and 13 the said sleeve is clamped tightly on the bolt 15 while the plate 23 may be moved pivotally about said sleeve. An arcuate slot 27 is cut in the plate 23 and when assembled as shown in Fig. 3 a screw 28 is fitted through a hole in the clamping plate 20 and friction sheet 21, slot 27, and a hole in the upward extension 14 of the cheek plate 13. This screw is preferably secured in the clamping plate 20, as by welding, and a wing nut 29 is fitted on said screw so that the plate 20, protractor 22 and plate 14 may be clamped together by tightening the wing-nut 29, thereby securing said protractor in any set position.

The ball race 18 has an inner sleeve 30 which is a push fit on the bolt 15, and an outer cage 31 which is constructed with a lug 32 and a tapped hole 33 diametrically opposite to said lug. Secured to the lug 32 by means of a screw 34 is a pointer 35. This pointer may be a plain arrowhead pointer but it preferably comprises an arm 36 having at its outer end a vernier head 37 as is shown in Fig. 1.

A swinging arm 38 carrying at its lower end a weight 39 is screw-threaded at its upper end as indicated by 40 whereby it is threadedly engaged in the tapped hole 33 in the ball-race cage 31.

An arrester 41 is fastened to the cheek plate 13 by screws 42 for the purpose of restraining the pointer 35 against movement to permit accurate readings of the protractor to be made, especially when the instrument is being used in some elevated position. The said arrester comprises two spaced arms 43 constructed of spring steel or like resilient material and a connecting bar 44 whereon a sleeve 45 of rubber or other suitable gripping material is fixed. The parts of the arrester are so arranged that by light finger pressure the sleeve 45 is moved into contact with the arm 38 and holds the latter against movement until a reading of the pointer in relation to the scale 24 has taken place, whereupon release of the finger pressure permits the arrester to spring back to its normal inoperative position.

Although the protractor head 10 is maintained firmly in abutment with the level bar 2 by the tension of the spring 8 it is permitted movement relatively to said level-bar. Consequently, the risk of said protractor head being seriously damaged in the event of the instrument being accidentally dropped onto a hard surface is minimized.

The graduations 24 of the protractor are from zero at the vertical centre to 70 degrees on both the left and the right hand side of this vertical centre of the protractor. This greatly facilitates readings of the instrument. If the movements of the pointer 35 be such that it passes beyond the limits of the graduations 24, the screw 34 by means of which said pointer is fastened to the lug 32 on the bearing cage 31 can be loosened and the pointer then set angularly to the arm 38 instead of being in vertical alignment therewith as is seen in Fig. 1. By making a suitable numerical adjustment of the readings of the clinometer the full range of movement of said pointer can then be determined.

What I do claim is:

1. An improved clinometer comprising, a level bar, a pivotal protractor head resiliently mounted on the level bar and adapted to be held in adjusted pivotal position, a spindle securely fitted in said protractor head, a freely rotatable bearing on said spindle, a weighted arm connected to said bearing, a lug on said bearing, an index pivotally connected to said bearing lug, a protractor pivotally mounted on said spindle, clamping plates fitted on said spindle on opposite sides of said protractor, an arcuate slot in said protractor, a bolt fitted through said clamping plates and said protractor, a nut on said bolt adapted to cause the clamping plates to grip the protractor to hold it in adjusted position, and a resiliently mounted arrester on the protractor head adapted to be pressed against the weighted arm to restrain the index against movement whilst readings of the instrument are being made.

2. An improved clinometer according to claim 1, the arrester comprising two oppositely positioned resilient arms and a link carried by said arms, said link being provided with a cover strip of material adapted to frictionally restrain the weighted arm against movement.

3. An improved clinometer according to claim 1, the level bar having supporting legs, a recess formed in said level bar, a stud fitted transversely through said level bar, the protractor head comprising a U-shaped bracket, a bolt pivotally connecting said bracket to said level bar, and a tension spring connected at its opposite ends to said stud and said bolt to permit flexibility of movement of said bracket.

4. A clinometer comprising in combination a level-bar of hollow construction, a transverse screw or rivet being passed through said level-bar, a bolt being passed through the end of the level-bar and through the adjacent end of the protractor head, a helical tension spring being connected at one end of said screw or rivet and at its opposite end to said bolt, a protractor head pivoted on said bolt, a spindle securely fitted in said protractor head, a protractor angularly adjustable on said spindle, means for locking said protractor in angularly adjusted position, a bearing rotatable on said spindle, a pointer or vernier head secured to said bearing, means for angularly adjusting said pointer or vernier head on said bearing, a weighted arm secured to said bearing to gravitationally move said pointer or vernier head, and supporting means carried by said level-bar.

5. A clinometer comprising in combination a level-bar, a protractor head pivotally fitted to said level-bar and provided with two parallel spaced cheek plates, a bolt being passed transversally through said cheek plates, a spacing washer supported by said bolt, a ball race provided with a turnable outer cage and supported by said bolt, a spring washer supported by said bolt, a clamping plate provided with a friction sheet and also supported by said bolt, a protractor clamped on said bolt between said cheek plates, means for locking said protractor in angularly adjusted position, a pointer or vernier head secured to the outer cage of said ball race, means for angularly adjusting said pointer or vernier head on said outer cage of said ball race, a weighted arm secured to said outer cage of said ball race to gravitationally move said pointer or vernier head, and supporting means carried by said level-bar.

6. A clinometer comprising in combination a level-bar, a protractor head pivotally fitted to said level-bar, means for maintaining said protractor head in pivotally adjusted position, a spindle securely fitted in said protractor head, a protractor angularly adjustable on said spindle, means for locking said protractor in angularly adjusted position, a bearing rotatable on said spindle, a pointer or vernier head secured to said bearing, means for angularly adjusting said pointer or vernier head on said bearing, a weighted arm secured to said bearing to gravitationally move said pointer or vernier head, supporting means carried by said level-bar, and an arrester resiliently mounted on said protractor head and adapted to be pressed against the weighted arm and restrain the pointer or vernier head against movement while readings of the instrument are taking place.

WALTER EDWARD AUSTEN.

REFERENCES CITED

The following references are of record in the file of this patent:

UNITED STATES PATENTS

| Number | Name | Date |
| --- | --- | --- |
| 721,694 | Green | Mar. 3, 1903 |
| 964,066 | Sprenkle | July 12, 1910 |
| 1,008,732 | Rosenquist | Nov. 14, 1911 |
| 1,123,269 | Franie | Jan. 5, 1925 |
| 1,454,693 | Schlattau | May 8, 1923 |
| 1,539,262 | McAleist | May 26, 1925 |

FOREIGN PATENTS

| Number | Country | Date |
| --- | --- | --- |
| 118,862 | Australia | 1944 |